US012710000B2

(12) United States Patent
Zhang et al.

(10) Patent No.: US 12,710,000 B2
(45) Date of Patent: Aug. 18, 2026

(54) COMPREHENSIVE ENERGY UTILIZATION SYSTEM FOR COUPLING CARBON CAPTURE, ENERGY STORAGE, AND THERMAL POWER GENERATION

(71) Applicant: Exax Energy Technology (Shenzhen) Co., Ltd, Shenzhen (CN)

(72) Inventors: Jie Zhang, Shenzhen (CN); Qin Wang, Shenzhen (CN)

(73) Assignee: Exax Energy Technology (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 19/346,497

(22) Filed: Sep. 30, 2025

(65) Prior Publication Data

US 2026/0193993 A1 Jul. 9, 2026

(30) Foreign Application Priority Data

Jan. 6, 2025 (CN) ........................ 202510013799.6

(51) Int. Cl.
*F01K 11/00* (2006.01)
*B01D 53/26* (2006.01)
(Continued)

(52) U.S. Cl.
CPC .............. *F01K 11/00* (2013.01); *B01D 53/26* (2013.01); *F01K 25/103* (2013.01); *F17C 5/02* (2013.01); *F22D 1/18* (2013.01); *B01D 2256/22* (2013.01); *B01D 2257/504* (2013.01); *B01D 2257/80* (2013.01); *B01D 2258/0283* (2013.01); *B01D 2259/65* (2013.01); *F17C 2205/0352* (2013.01); *F17C 2221/013* (2013.01);
(Continued)

(58) Field of Classification Search
CPC ....... F01K 11/00; F01K 25/103; B01D 53/26; B01D 2256/22; B01D 2257/504; B01D 2257/80; B01D 2259/65; F22D 1/18; F17C 2205/0352; F17C 2221/013; F17C 2227/0157; F25J 1/0027; F25J 2240/02
USPC ........................................................... 60/659
See application file for complete search history.

(56) References Cited

U.S. PATENT DOCUMENTS

2012/0067048 A1* 3/2012 Mishima ................ F22B 1/003
60/670

FOREIGN PATENT DOCUMENTS

CN 116221616 A 6/2023
CN 116857027 A 10/2023
(Continued)

*Primary Examiner* — Devon C Kramer
*Assistant Examiner* — Kelsey L Stanek

(57) ABSTRACT

A comprehensive energy utilization system includes a thermal power generation system, an energy storage system, and a carbon capture system. A compression energy storage unit of the energy storage system is coupled to a feedwater reheating unit of the thermal power generation system. An expansion energy release unit of the energy storage system is coupled to a steam turbine generator set of the thermal power generation system. The steam-water circulating working fluid in the thermal power generation system is used as the heat storage and cold storage medium for the energy storage system. The carbon capture system is coupled between the coal-fired boiler unit and the energy storage system, and captures carbon dioxide gas from flue gas and inputs it into the energy storage system as a circulating working fluid. Residual heat from the flue gas is used to heat the circulating working fluid in the expansion energy release unit.

6 Claims, 1 Drawing Sheet

(51) Int. Cl.

| | |
|---|---|
| ***F01K 25/10*** | (2006.01) |
| ***F17C 5/02*** | (2006.01) |
| ***F22D 1/18*** | (2006.01) |
| *F25J 1/00* | (2006.01) |

(52) U.S. Cl.

CPC ..... *F17C 2227/0157* (2013.01); *F25J 1/0027* (2013.01); *F25J 2240/02* (2013.01)

(56) References Cited

FOREIGN PATENT DOCUMENTS

| | | | | | |
|---|---|---|---|---|---|
| CN | 117628836 A | | 3/2024 | | |
| CN | 117703538 A | * | 3/2024 | .............. | F04B 41/02 |
| CN | 118242920 A | * | 6/2024 | ........... | F25D 31/005 |
| CN | 118935914 A | * | 11/2024 | .............. | F26B 21/50 |

* cited by examiner

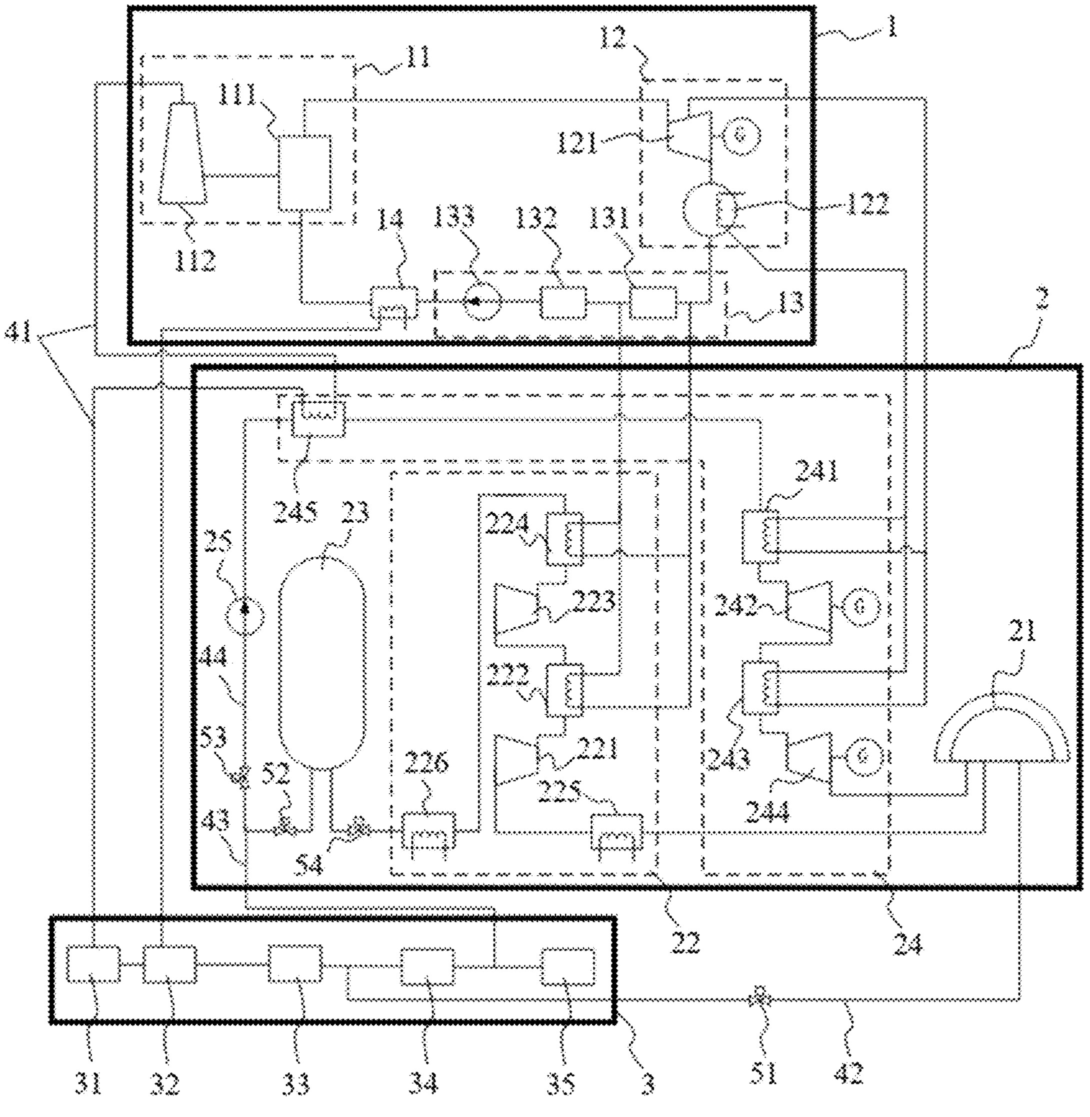
1
11
12
111
121
122
112
14
133
132
131
13
2
41
245
23
241
224
25
223
242
44
222
21
53
52
221
243
226
225
244
43
54
22
24
31
32
33
34
35
3
51
42

COMPREHENSIVE ENERGY UTILIZATION SYSTEM FOR COUPLING CARBON CAPTURE, ENERGY STORAGE, AND THERMAL POWER GENERATION

CROSS-REFERENCE TO RELATED APPLICATION

This application claims priority to Chinese Patent Application No. 202510013799.6, filed Jan. 6, 2025, which is herein incorporated by reference in its entirety.

TECHNICAL FIELD

The disclosure relates to the field of comprehensive energy utilization technologies, and more particularly to a comprehensive energy utilization system for coupling carbon capture, energy storage, and thermal power generation.

BACKGROUND

Based on the optimization and adjustment of the energy structure, and the strict control of industrial pollutants, increasing the proportion of renewable energy installed capacity and power generation is a major development trend in the energy industry. Meanwhile, the main function of thermal power generation has also changed accordingly, shifting from being the main power supplier to participating in and supporting the grid for deep peak regulation. However, due to the constraints of weather and climate conditions, renewable energy power generation methods such as wind power, solar thermal, and photovoltaic generally have intermittency and significant fluctuation. In order to compensate for the reduction in grid stability caused by the integration of renewable energy, thermal power units and energy storage devices need to undertake heavier peak regulation tasks.

By using surplus electricity or clean energy to compress and condense the gaseous carbon dioxide in the gas storage tank at normal temperature and normal pressure into liquid carbon dioxide and store the liquid carbon dioxide in the storage tank during the low electricity consumption period, and storing the heat generated during the compression process, and using the stored heat to heat the liquid carbon dioxide to gas during the peak electricity consumption period, where the gaseous carbon dioxide drives the turbine to drive the generator to generate electricity, and the gaseous carbon dioxide after doing work returns to the gas storage tank for circulation use, the energy storage technology based on the phase change cycle of carbon dioxide gas and liquid has the advantages of simple structure, flexible layout, and relatively high energy storage efficiency, and has gradually attracted widespread attention.

At present, there is no energy comprehensive utilization system that deeply couples carbon capture, carbon dioxide energy storage, and thermal power generation in the industry.

SUMMARY

In view of the foregoing, the disclosure provides a comprehensive energy utilization system for coupling carbon capture, energy storage, and thermal power generation, so as to solve the problem of how to deeply couple the carbon capture, the carbon dioxide energy storage and the thermal power generation, thereby improving the energy comprehensive utilization efficiency of the system and reducing the emission of gas pollutants.

In order to achieve the above purposes, the disclosure adopts the following technical solutions.

A comprehensive energy utilization system for coupling carbon capture, energy storage, and thermal power generation includes: a thermal power generation system, an energy storage system, and a carbon capture system.

The thermal power generation system includes a coal-fired boiler unit, a steam turbine generator set, and a feedwater reheating unit.

The energy storage system includes a compression energy storage unit and an expansion energy release unit. The compression energy storage unit is coupled to the feedwater reheating unit and configured to draw condensate water from the feedwater reheating unit to cool circulating working fluid in the compression energy storage unit and to increase a temperature of the condensate water; and the expansion energy release unit is coupled to the steam turbine generator set and configured to draw steam from the steam turbine generator set to heat circulating working fluid in the expansion energy release unit.

The carbon capture system is coupled between the coal-fired boiler unit and the energy storage system, and configured to capture carbon dioxide gas from flue gas in the coal-fired boiler unit and input the carbon dioxide gas into the energy storage system as the circulating working fluid.

The energy storage system further includes a gas storage unit and a liquid storage unit, and the carbon capture system includes a carbon dioxide capture device, a carbon dioxide compressor, a dryer, a liquefier, and a storage container sequentially connected in that order. In an embodiment, the gas storage unit is a gas storage container; and the liquid storage unit is a liquid storage container.

The carbon dioxide capture device is connected to the coal-fired boiler unit through a first connecting pipeline, the first connecting pipeline is coupled to the expansion energy release unit, and the coal-fired boiler unit is configured to heat the circulating working fluid in the expansion energy release unit by using residual heat of the flue gas.

The dryer is connected to the gas storage unit through a second connecting pipeline, a pressure-reducing mechanism is disposed on the second connecting pipeline, the carbon dioxide capture device is configured to capture the carbon dioxide gas from the flue gas, the carbon dioxide compressor and the dryer are respectively configured to compress and dry the carbon dioxide gas, and the second connecting pipeline is configured to convey the carbon dioxide gas after drying to the gas storage unit.

The liquefier is connected to the liquid storage unit through a third connecting pipeline, the liquefier is configured to liquefy the carbon dioxide gas from the liquid storage unit to obtain liquefied carbon dioxide, and the third connecting pipeline is configured to convey the liquefied carbon dioxide to the liquid storage unit.

In an embodiment, the thermal power generation system further includes a feedwater heater connected between the coal-fired boiler unit and the feedwater reheating unit, the carbon dioxide compressor is coupled to the feedwater heater, and the carbon dioxide compressor is configured to convey heat generated by the carbon dioxide compressor when compressing the carbon dioxide gas to the feedwater heater to heat boiler feedwater output from the feedwater reheating unit, and convey the boiler feedwater after heating to the coal-fired boiler unit.

In an embodiment, the feedwater reheating unit includes a low-pressure heater, a deaerator, and a feedwater pump sequentially connected in that order; and the compression energy storage unit is further configured to draw the condensate water from an inlet end of the low-pressure heater to cool the circulating working fluid in the compression energy storage unit and increase the temperature of the condensate water, and then convey the condensate water to an outlet end of the low-pressure heater.

In an embodiment, the compression energy storage unit includes a first-stage compressor, a first-stage heat exchanger, a second-stage compressor, and a second-stage heat exchanger sequentially connected in that order; and the low-pressure heater is configured to convey the condensate water drawn from the inlet end of the low-pressure heater to the first-stage heat exchanger and the second-stage heat exchanger to cool the circulating working fluid in the first-stage heat exchanger and the second-stage heat exchanger and to increase the temperature of the condensate water.

In an embodiment, the compression energy storage unit further includes: a preheater connected to an inlet end of the first-stage compressor, and a condenser connected to an outlet end of the second-stage heat exchanger.

In an embodiment, the steam turbine generator set includes a steam turbine and a steam condenser connected to each other; and the expansion energy release unit is configured to draw the steam from the steam turbine to heat the circulating working fluid in the expansion energy release unit, and convey the steam to the steam condenser.

In an embodiment, the expansion energy release unit includes: a third-stage heat exchanger, a first-stage turbine, a fourth-stage heat exchanger, and a second-stage turbine sequentially connected in that order; and the steam turbine is configured to convey the steam drawn from the steam turbine to the third-stage heat exchanger and the fourth-stage heat exchanger to heat the circulating working fluid in the third-stage heat exchanger and the fourth-stage heat exchanger.

In an embodiment, the expansion energy release unit further includes an evaporator connected to an inlet end of the third-stage heat exchanger, and the first connecting pipeline is coupled to the evaporator to heat the circulating working fluid in the evaporator by using the residual heat of the flue gas.

The comprehensive energy utilization system coupling carbon capture with energy storage and thermal power generation provided in the embodiments of the disclosure deeply couples the thermal power generation system, the carbon dioxide energy storage system, and the carbon capture system. On one hand, the steam-water circulating working fluid in the thermal power generation system is used as the heat storage and cold storage medium for the carbon dioxide energy storage system. This not only improves the operating efficiency of the thermal power generation system and the carbon dioxide energy storage system, but also enhances the overall energy utilization efficiency of the system. Furthermore, the carbon dioxide energy storage system does not need to set up additional heat storage and cold storage devices, simplifying the system structure. On the other hand, the carbon capture system is coupled between the thermal power generation system and the carbon dioxide energy storage system. The carbon capture system captures the carbon dioxide gas from the flue gas emitted by the thermal power generation system and inputs the carbon dioxide gas into the carbon dioxide energy storage system as the circulating working fluid. This reduces the emission of gaseous pollutants from the thermal power generation system, and enables the recovery and reuse of carbon dioxide, thereby increasing its added value. Moreover, during the process of capturing carbon dioxide gas, the carbon capture system couples the residual heat of the flue gas emitted by the thermal power generation system to the carbon dioxide energy storage system, using the residual heat of the flue gas to heat the carbon dioxide circulating working fluid in the expansion energy release unit, thereby further improving the energy utilization efficiency.

BRIEF DESCRIPTION OF DRAWING

FIGURE illustrates a schematic structural diagram of a comprehensive energy utilization system for coupling carbon capture, energy storage, and thermal power generation according to an embodiment of the disclosure.

DETAILED DESCRIPTION OF EMBODIMENTS

In order to clarify the purpose, technical solution, and advantages of the disclosure, the specific embodiments of the disclosure will be described in detail below in conjunction with the accompanying drawing. Examples of these exemplary embodiments are illustrated in the accompanying drawing. The embodiments of the disclosure shown in the drawing and described based on the drawing are merely exemplary and the disclosure is not limited to these embodiments.

It should be noted that the same or similar reference numbers in the accompanying drawings of the embodiments of the disclosure correspond to the same or similar components; In the description of the disclosure, it should be understood that if there are terms such as "up", "down", "left", "right" indicating orientation or positional relationships based on the orientation or positional relationships shown in the drawing, it is only for the convenience of describing the disclosure and simplifying the description, and does not indicate or imply that the device or component referred to must have a specific orientation, be constructed and operated in a specific orientation. Therefore, the terms used to describe positional relationships in the drawing are for illustrative purposes only and cannot be understood as limitations on the present patent. For ordinary skilled persons in the art, the specific meanings of the above terms can be understood according to specific situations.

It should be noted that in order to avoid blurring the disclosure due to unnecessary details, only the structures and/or processing steps closely related to the solution according to the disclosure are shown in the accompanying drawings, and other details that are not closely related to the disclosure are omitted.

An embodiment of the disclosure provides a comprehensive energy utilization system for coupling carbon capture, energy storage, and thermal power generation. As shown in figure, the comprehensive energy utilization system includes a thermal power generation system 1, an energy storage system 2, and a carbon capture system 3.

As shown in figure, the thermal power generation system 1 includes a coal-fired boiler unit 11, a steam turbine generator set 12, and a feedwater reheating unit 13. The coal-fired boiler unit 11 is configured to heat water to evaporate the water into steam and convey the steam to the steam turbine generator set 12. The steam turbine generator set 12 is configured to use the steam to generate electricity. After releasing energy in the steam turbine generator set 12, the steam is condensed into condensate water and conveyed to the feedwater reheating unit 13, and the feedwater reheating unit 13 is configured to heat the condensate water and then convey the condensate water to the coal-fired boiler unit 11.

As a specific example, in this embodiment, as shown in figure, the coal-fired boiler unit 11 includes a coal-fired boiler 111 and a chimney 112. The feedwater reheating unit 13 is configured to heat the condensate water and then convey the condensate water to the coal-fired boiler 111 for heating and evaporation. The flue gas generated by the coal-fired boiler 111 is emitted through the chimney 112. The steam turbine generator set 12 includes a steam turbine 121 and a steam condenser 122 connected to each other. The steam generated by the coal-fired boiler unit 11 is conveyed to the steam turbine 121, and the steam turbine 121 drives the corresponding generator to generate electricity. After releasing energy in the steam turbine 121, the steam is conveyed to the steam condenser 122, and then is condensed by the steam condenser 122 into the condensate water, and the condensate water is conveyed to the feedwater reheating unit 13. The feedwater reheating unit 13 includes a low-pressure heater 131, a deaerator 132, and a feedwater pump 133 sequentially connected in that order. The condensate water output from the steam condenser 122 is sequentially heated by the low-pressure heater 131, deoxygenated by the deaerator 132, and then conveyed to the coal-fired boiler unit 11 by the feedwater pump 133.

Specifically, the energy storage system 2 is a carbon dioxide energy storage system. The energy storage system 2 mainly includes a gas storage unit 21, a compression energy storage unit 22, a liquid storage unit 23, and an expansion energy release unit 24 connected in a closed loop sequentially in that order. The gas storage unit 21 is configured to store gaseous carbon dioxide at normal pressure, and the liquid storage unit 23 is configured to store liquid carbon dioxide. The gaseous carbon dioxide flowing out from the gas storage unit 21 is transformed into liquid carbon dioxide at a preset energy storage pressure through the compression energy storage unit 22 and then flows into the liquid storage unit 23, completing the energy storage during the process. The liquid carbon dioxide output from the liquid storage unit 23 releases energy and is transformed into gaseous carbon dioxide at normal pressure through the expansion energy release unit 24, and the gaseous carbon dioxide flows into the gas storage unit 21, completing the energy release and application during the process. Typically, during off-peak electricity consumption periods or by utilizing abandoned wind and solar power, the compression energy storage unit 22 compresses gaseous carbon dioxide into liquid carbon dioxide and stores the liquid carbon dioxide in the liquid storage unit 23, converting energy into compression energy and thermal energy for storage. During peak electricity consumption periods, the expansion energy release unit 24 vaporizes and expands the liquid carbon dioxide to do work, releasing and converting the stored energy into electrical energy for use.

Specifically, specific compositions and structures of the gas storage unit 21, the compression energy storage unit 22, the liquid storage unit 23, and the expansion energy release unit 24 can refer to the related art, such as the technical solutions disclosed in existing Chinese patent publication documents CN11621616A, CN117628836A, and CN116857027A.

As a specific example, in this embodiment, as shown in figure, the compression energy storage unit 22 mainly includes a first-stage compressor 221, a first-stage heat exchanger 222, a second-stage compressor 223, and a second-stage heat exchanger 224, which are connected in sequence between the gas storage unit 21 and the liquid storage unit 23. The compression energy storage unit 22 further includes a preheater 225 connected to an inlet end of the first-stage compressor 221, and a condenser 226 connected to the outlet end of the second-stage heat exchanger 224. On the compression-heat release-energy storage loop, the gaseous carbon dioxide is preheated by the preheater 225 and then undergoes two-stage compression through the first-stage compressor 221 and the second-stage compressor 223 sequentially. The gaseous carbon dioxide after the two-stage compression is liquefied by the condenser 226 to form the liquid carbon dioxide, and the liquid carbon dioxide is stored in the liquid storage unit 23.

As a specific example, in this embodiment, as shown in figure, the expansion energy release unit 24 mainly includes an evaporator 245, a third-stage heat exchanger 241, a first-stage turbine 242, a fourth-stage heat exchanger 243, and a second-stage turbine 244, which are connected sequentially in that order between the liquid storage unit 23 and the gas storage unit 21. On the heat absorption-expansion-energy release loop, the liquid carbon dioxide absorbs the heat, vaporizes and expands in the evaporator 245, does work externally (for example, driving the corresponding generator to generate electricity) through the first-stage turbine 242 and the second-stage turbine 244 in sequence, releasing energy, and then is transformed into the gaseous carbon dioxide at normal pressure, which is stored in the gas storage unit 21.

As shown in figure, the carbon capture system 3 mainly includes a carbon dioxide capture device 31, a carbon dioxide compressor 32, a dryer 33, a liquefier 34, and a storage container 35, which are connected sequentially in that order. The carbon dioxide capture device 31 captures the carbon dioxide gas from the flue gas emitted by the thermal power generation system 1. After sequentially being compressed by the carbon dioxide compressor 32, dried by the dryer 33, and liquefied by the liquefier 34, the liquid carbon dioxide (i.e., the liquefied carbon dioxide) is obtained and stored in the storage container 35. In the traditional carbon capture system 3, the liquid carbon dioxide stored in the storage container 35 is transported externally and sequestered in specific containers for application in other industrial fields.

In this embodiment, as shown in figure, the compression energy storage unit 22 is coupled to the feedwater reheating unit 13, and configured to draw condensate water from the feedwater reheating unit 13 to cool circulating working fluid in the compression energy storage unit 22 and to increase a temperature of the condensate water. The expansion energy release unit 24 is coupled to the steam turbine generator set 12 and configured to draw steam from the steam turbine generator set 12 to heat the circulating working fluid in the expansion energy release unit 24. The carbon capture system 3 is coupled between the coal-fired boiler unit 11 and the energy storage system 2, and is configured to capture the carbon dioxide gas from the flue gas in the coal-fired boiler unit 11 and input the carbon dioxide gas into the energy storage system 2 as the circulating working fluid. The carbon capture system 3 is connected to the coal-fired boiler unit 11 via a first connecting pipeline 41, and the first connecting pipeline 41 is coupled to the expansion energy release unit 24. The residual heat of the flue gas is used to heat the circulating working fluid in the expansion energy release unit 24.

Specifically, the first connecting pipeline 41 is coupled to the evaporator 245, and the residual heat of the flue gas is used to heat the circulating working fluid in the evaporator 245. This further utilizes the residual heat of the flue gas emitted by the thermal power generation system 1, reduces heat loss, realizes the utilization of low-quality flue gas residual heat, reduces the use of the high-quality heat source in the carbon dioxide energy storage system 2 during energy release, and enhances the overall energy-utilization efficiency of the system.

As an exemplary solution, in this embodiment, as shown in figure, in the carbon capture system 3, the carbon dioxide capture device 31 is connected to the chimney 112 of the coal-fired boiler unit 11 via the first connecting pipeline 41. Additionally, an output end of the dryer 33 is connected to the gas storage unit 21 through a second connecting pipeline 42. The second connecting pipeline 42 is provided with a pressure-reducing mechanism 51 thereon. The carbon dioxide capture device 31 captures the carbon dioxide gas from the flue gas emitted by the chimney 112. After being compressed by the carbon dioxide compressor 32 and dried by the dryer 33, the carbon dioxide gas is conveyed through the second connecting pipeline 42 into the gas storage unit 21. In this way, the carbon dioxide captured by the carbon capture system 3 is input into the energy storage system 2 as the circulating working fluid in a form of gaseous carbon dioxide. Given that the gaseous carbon dioxide is at a high pressure after being compressed by the carbon dioxide compressor 32, the pressure-reducing mechanism 51 is installed on the second connecting pipeline 42. By using the pressure-reducing mechanism 51 for throttling and pressure reduction, the gaseous carbon dioxide is converted to normal pressure, and then is fed into the gas storage unit 21 of the energy storage system 2. In a specific example, the pressure-reducing mechanism 51 is selected to be a throttle valve.

As an exemplary solution, in this embodiment, as shown in figure, the thermal power generation system 1 further includes a feedwater heater 14 connected between the coal-fired boiler unit 11 and the feedwater reheating unit 13. Specifically, the feedwater heater 14 is connected between the coal-fired boiler 111 and the feedwater pump 133. The carbon dioxide compressor 32 is coupled to the feedwater heater 14. The heat generated by the carbon dioxide compressor 32 during the compression of the carbon dioxide gas is conveyed to the feedwater heater 14, to heat the boiler feedwater output from the feedwater reheating unit 13, and the boiler feedwater after heating is sent to the coal-fired boiler unit 11. In this way, on one hand, the compression heat generated by the carbon capture system 3 is utilized to heat the boiler feedwater, raising the temperature of the boiler feedwater. This reduces the coal consumption in the coal-fired boiler 111, improves the operating efficiency of the thermal power generation system 1, and enhances the overall energy utilization efficiency of the system. On the other hand, the heat generated by the carbon dioxide compressor 32 is efficiently extracted in a timely manner, improving the efficiency of the carbon dioxide compressor 32, reducing the power consumption of the carbon dioxide compressor 32, and thereby further enhancing the operating efficiency of the carbon capture system 3.

As an exemplary solution, in this embodiment, as shown in figure, the output end of the liquefier 34 is connected to the liquid storage unit 23 through a third connecting pipeline 43. After being compressed by the carbon dioxide compressor 32, dried by the dryer 33, and liquefied by the liquefier 34, the obtained liquid carbon dioxide can be conveyed into the liquid storage unit 23 through the third connecting pipeline 43. Thus, the carbon dioxide captured by the carbon capture system 3 can be introduced into the energy storage system 2 in the form of liquid carbon dioxide to serve as the circulating working fluid. That is, in the comprehensive energy utilization system provided by this embodiment, the carbon dioxide captured by the carbon capture system 3 can be supplied to the energy storage system 2 as the circulating working fluid in the form of gaseous carbon dioxide and/or liquid carbon dioxide, depending on actual needs. Combined with the storage container 35 in the carbon capture system 3, which is capable of storing the liquid carbon dioxide, the comprehensive energy utilization system offers more flexible and comprehensive storage and utilization of carbon dioxide working fluid. Particularly during the initial start-up phase of the energy storage system 2, the carbon capture system 3 can replenish a large amount of liquid carbon dioxide to the liquid storage unit 23. This allows for direct energy release during peak electricity consumption periods, reducing the energy storage process, simultaneously achieving system gas replacement and efficient energy utilization, thereby more effectively enhancing the peak-shaving capability of the combined thermal power unit and energy storage system for the power grid.

Specifically, the output end of the liquid storage unit 23 is connected to the evaporator 245 through a fourth connecting pipeline 44, and a booster pump 25 is disposed on the fourth connecting pipeline 44. On the fourth connecting pipeline 44, a first control valve 52 and a second control valve 53 are sequentially installed between the output end of the liquid storage unit 23 and the booster pump 25. The third connecting pipeline 43 is connected to the fourth connecting pipeline 44 between the first control valve 52 and the second control valve 53. Thus, by controlling the open and closed states of the first control valve 52 and the second control valve 53, the liquid carbon dioxide output from the liquefier 34 through the third connecting pipeline 43 can either be fed into the liquid storage unit 23 (where the first control valve 52 is open, the second control valve 53 is closed) or directly fed into the expansion energy release unit 24 via the booster pump 25 (where the first control valve 52 is closed, the second control valve 53 is open).

Furthermore, in the embodiment, a third control valve 54 is installed on the connecting pipeline between the condenser 226 and the liquid storage unit 23.

As an exemplary solution, in this embodiment, as shown in figure, the compression energy storage unit 22 is coupled to the feedwater reheating unit 13. The condensate water is drawn from the inlet end of the low-pressure heater 131 to cool the circulating working fluid in the compression energy storage unit 22 and increase the temperature of the condensate water, and then conveyed to the outlet end of the low-pressure heater 131. On one hand, using the relatively cool condensate water to cool the circulating working fluid in the compression energy storage unit 22 allows for rapid heat exchange, which enhances the compression efficiency of the compression energy storage unit 22 and, in turn, improves the operational efficiency of the energy storage system 2. On the other hand, after the heat exchange, the temperature of the condensate water is significantly increased, which can reduce the amount of steam extracted from the steam turbine generator set 12 by the feedwater reheating unit 13, increasing the power generation, and improving the system efficiency of the thermal power generation system 1. The expansion energy release unit 24 is coupled to the steam turbine generator set 12. The steam is drawn from the steam turbine 121 to heat the circulating working fluid in the expansion energy release unit 24, and then conveyed to the condenser 122. By extracting the steam from the steam turbine 121 of the thermal power generation system 1 (the extraction point is determined based on the thermal balance), the necessary heat for the energy release process of the energy storage system 2 is provided. This increases the main gas temperature of carbon dioxide during the energy release process of the energy storage system 2, thereby further enhancing the efficiency of the energy storage system 2. Furthermore, by using the steam-water cycle working fluid from the thermal power generation system 1 as the heat storage and cold storage medium for the energy storage system 2, there is no need for additional heat storage and cold storage devices in the energy storage system 2, simplifying the system structure.

As previously described, in this embodiment, the compression energy storage unit 22 includes a first-stage compressor 221, a first-stage heat exchanger 222, a second-stage compressor 223, and a second-stage heat exchanger 224 connected sequentially in that order. As shown in figure, the condensate water drawn from the inlet end of the low-pressure heater 131 is conveyed to the first-stage heat exchanger 222 and the second-stage heat exchanger 224 to cool the circulating working fluid in the first-stage heat exchanger 222 and the second-stage heat exchanger 224 while raising the temperature of the condensate water. The condensate water, whose temperature has been raised through heat exchange in the first-stage heat exchanger 222 and the second-stage heat exchanger 224, is then conveyed simultaneously to the outlet end of the low-pressure heater 131.

As previously described, in this embodiment, the expansion energy release unit 24 includes a third-stage heat exchanger 241, a first-stage turbine 242, a fourth-stage heat exchanger 243, and a second-stage turbine 244 connected sequentially in that order. The steam drawn from the steam turbine 121 is conveyed to the third-stage heat exchanger 241 and the fourth-stage heat exchanger 243 to heat the circulating working fluid in the third-stage heat exchanger 241 and the fourth-stage heat exchanger 243. The extracted steam condensate formed in the third-stage heat exchanger 241 and the fourth-stage heat exchanger 243 after heat exchange is conveyed simultaneously to the steam condenser 122, where it further condenses into the condensate water.

In summary, the comprehensive energy utilization system provided in the embodiments of the disclosure deeply couples the thermal power generation system 1, the carbon dioxide energy storage system 2, and the carbon capture system 3. On one hand, the steam-water cycle working fluid in the thermal power generation system 1 is used as the heat storage and cold storage medium for the carbon dioxide energy storage system 2. This not only improves the operating efficiency of the thermal power generation system 1 and the carbon dioxide energy storage system 2, but also enhances the overall energy utilization efficiency of the system. Furthermore, the carbon dioxide energy storage system 2 does not need to set up additional heat storage and cold storage devices, simplifying the system structure. On the other hand, the carbon capture system 3 is coupled between the thermal power generation system 1 and the carbon dioxide energy storage system 2. The carbon capture system 3 captures the carbon dioxide gas from the flue gas emitted by the thermal power generation system 1 and inputs the carbon dioxide gas into the carbon dioxide energy storage system 2 as the circulating working fluid. This reduces the emission of gaseous pollutants from the thermal power generation system 1, and enables the recovery and reuse of carbon dioxide, thereby increasing its added value. Moreover, during the process of capturing carbon dioxide gas, the carbon capture system 3 couples the residual heat of the flue gas emitted by the thermal power generation system 1 to the carbon dioxide energy storage system 2, using the residual heat of the flue gas to heat the carbon dioxide circulating working fluid in the expansion energy release unit, thereby further improving the energy utilization efficiency.

The above is only a specific implementation of the disclosure. It should be pointed out that for those skilled in the art, several improvements and embellishments can be made without departing from the principles of the disclosure. These improvements and embellishments should also be considered as the scope of protection of the disclosure.

What is claimed is:

1. A comprehensive energy utilization system for coupling carbon capture, energy storage, and thermal power generation, comprising:

a thermal power generation system, comprising a coal-fired boiler unit, a steam turbine generator set, and a feedwater reheating unit;

an energy storage system, comprising a compression energy storage unit and an expansion energy release unit, wherein the compression energy storage unit is coupled to the feedwater reheating unit and configured to draw condensate water from the feedwater reheating unit to cool circulating working fluid in the compression energy storage unit and to increase a temperature of the condensate water; and the expansion energy release unit is coupled to the steam turbine generator set and configured to draw steam from the steam turbine generator set to heat circulating working fluid in the expansion energy release unit; and a carbon capture system, coupled between the coal-fired boiler unit and the energy storage system, and configured to capture carbon dioxide gas from flue gas in the coal-fired boiler unit and input the carbon dioxide gas into the energy storage system as the circulating working fluid;

wherein the feedwater reheating unit comprises a low-pressure heater, a deaerator, and a feedwater pump sequentially connected in that order; and the compression energy storage unit is further configured to draw the condensate water from an inlet end of the low-pressure heater to cool the circulating working fluid in the compression energy storage unit and increase the temperature of the condensate water, and then convey the condensate water to an outlet end of the low-pressure heater;

wherein the energy storage system further comprises a gas storage unit and a liquid storage unit, and the carbon capture system comprises a carbon dioxide capture device, a carbon dioxide compressor, a dryer, a liquefier, and a storage container sequentially connected in that order;

wherein the carbon dioxide capture device is connected to the coal-fired boiler unit through a first connecting pipeline, the first connecting pipeline is coupled to the expansion energy release unit, and the coal-fired boiler unit is configured to heat the circulating working fluid in the expansion energy release unit by using residual heat of the flue gas;

wherein the dryer is connected to the gas storage unit through a second connecting pipeline, a pressure-reducing mechanism is disposed on the second connecting pipeline, the carbon dioxide capture device is configured to capture the carbon dioxide gas from the flue gas, the carbon dioxide compressor and the dryer are respectively configured to compress and dry the carbon dioxide gas, and the second connecting pipeline is configured to convey the carbon dioxide gas after drying to the gas storage unit;

wherein the liquefier is connected to the liquid storage unit through a third connecting pipeline, the liquefier is configured to liquefy the carbon dioxide gas from the liquid storage unit to obtain liquefied carbon dioxide, and the third connecting pipeline is configured to convey the liquefied carbon dioxide to the liquid storage unit; and wherein the thermal power generation system further comprises a feedwater heater connected between the coal-fired boiler unit and the feedwater reheating unit, the carbon dioxide compressor is coupled to the feedwater heater, and the carbon dioxide compressor is configured to convey heat generated by the carbon dioxide compressor when compressing the carbon dioxide gas to the feedwater heater to heat boiler feedwater output from the feedwater reheating unit, and convey the boiler feedwater after heating to the coal-fired boiler unit.

2. The comprehensive energy utilization system as claimed in claim 1, wherein the compression energy storage unit comprises a first-stage compressor, a first-stage heat exchanger, a second-stage compressor, and a second-stage heat exchanger sequentially connected in that order; and the low-pressure heater is configured to convey the condensate water drawn from the inlet end of the low-pressure heater to the first-stage heat exchanger and the second-stage heat exchanger to cool the circulating working fluid in the first-stage heat exchanger and the second-stage heat exchanger and to increase the temperature of the condensate water.

3. The comprehensive energy utilization system as claimed in claim 2, wherein the compression energy storage unit further comprises: a preheater connected to an inlet end of the first-stage compressor, and a condenser connected to an outlet end of the second-stage heat exchanger.

4. The comprehensive energy utilization system as claimed in claim 1, wherein the steam turbine generator set comprises a steam turbine and a steam condenser connected to each other;

and the expansion energy release unit is configured to draw the steam from the steam turbine to heat the circulating working fluid in the expansion energy release unit, and convey the steam to the steam condenser.

5. The comprehensive energy utilization system as claimed in claim 4, wherein the expansion energy release unit comprises: a third-stage heat exchanger, a first-stage turbine, a fourth-stage heat exchanger, and a second-stage turbine sequentially connected in that order; and wherein the steam turbine is configured to convey the steam drawn from the steam turbine to the third-stage heat exchanger and the fourth-stage heat exchanger to heat the circulating working fluid in the third-stage heat exchanger and the fourth-stage heat exchanger.

6. The comprehensive energy utilization system as claimed in claim 5, wherein the expansion energy release unit further comprises an evaporator connected to an inlet end of the third-stage heat exchanger, and the first connecting pipeline is coupled to the evaporator to heat the circulating working fluid in the evaporator by using the residual heat of the flue gas.

* * * * *